No. 697,398. Patented Apr. 8, 1902.
W. H. DOUGHERTY.
ROTARY ENGINE.
(Application filed Apr. 22, 1901.)
(No Model.) 2 Sheets—Sheet 1.

WITNESSES:
Paul C. Haan
E. L. Livingston

INVENTOR
William H. Dougherty
BY
Garry P. Van Wye
ATTORNEY

No. 697,398. Patented Apr. 8, 1902.
W. H. DOUGHERTY.
ROTARY ENGINE.
(Application filed Apr. 22, 1901.)
(No Model.) 2 Sheets—Sheet 2.
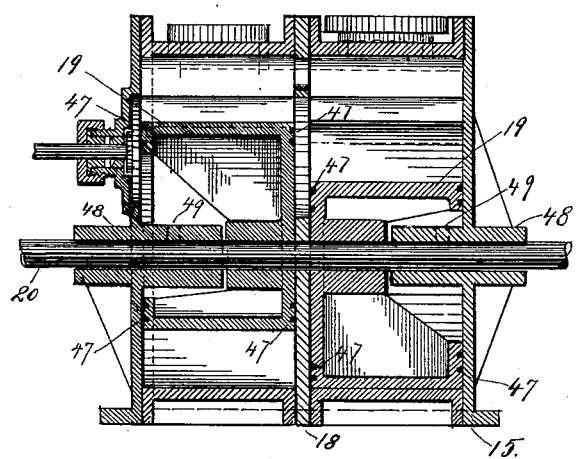
Fig. 5.
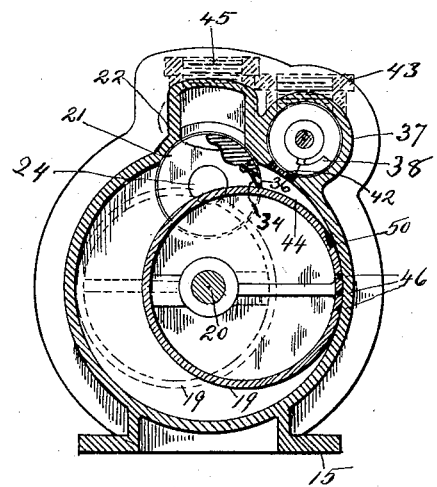
Fig. 6.
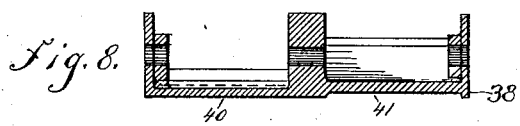
Fig. 8.
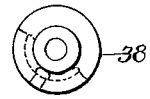
Fig. 9.
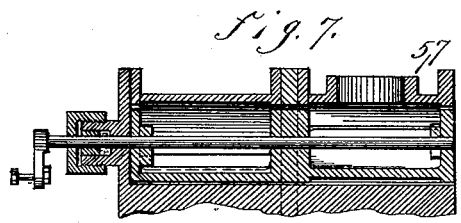
Fig. 7.
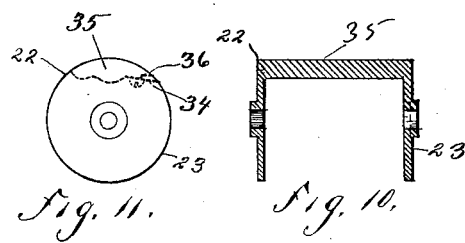
Fig. 11. Fig. 10.
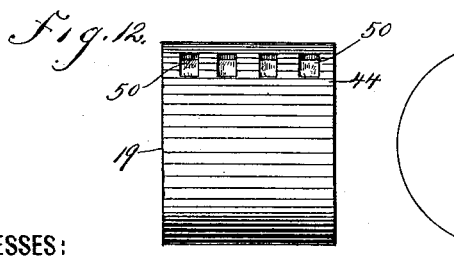
Fig. 12.
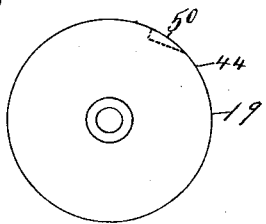
WITNESSES:
Paul C. Haan
E. L. Livingstone
INVENTOR
William H. Dougherty
BY
Garry P. Van Wye
ATTORNEY
THE NORRIS PETERS CO., PHOTO-LITHO., WASHINGTON, D. C.

UNITED STATES PATENT OFFICE.

WILLIAM H. DOUGHERTY, OF NEW YORK, N. Y., ASSIGNOR TO THE AMERICAN MOTOR AND POWER COMPANY, OF JERSEY CITY, NEW JERSEY.

ROTARY ENGINE.

SPECIFICATION forming part of Letters Patent No. 697,398, dated April 8, 1902.

Application filed April 22, 1901. Serial No. 56,921. (No model.)

*To all whom it may concern:*

Be it known that I, WILLIAM H. DOUGHERTY, a citizen of the United States, residing at New York, in the county and State of New York, have invented a new and useful Rotary Engine, of which the following is a specification.

My invention relates to rotary engines, and is designed as an improvement on the engine patented to me November 1, 1898, No. 613,255.

The object of my present invention is, first, to provide an engine with two or more coöperating cylinders and pistons; second, to provide separate but coöperating abutments and to avoid the use of eccentrics to hold the edges of the same against the respective pistons; third, to provide the abutments with removable bearing-strips and to adjust the same so that close contact with the pistons will be insured; fourth to provide against the escape or loss of steam with the minimum of friction, and, fifth, to reduce the cost of manufacture to the lowest possible point.

With these and other objects in view my invention consists of the construction, arrangement, and combination of parts set forth in the accompanying drawings, in which—

Figure 1:
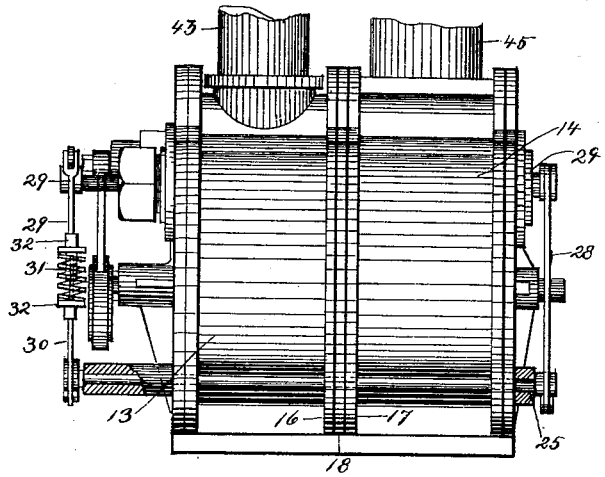
Figure 2:
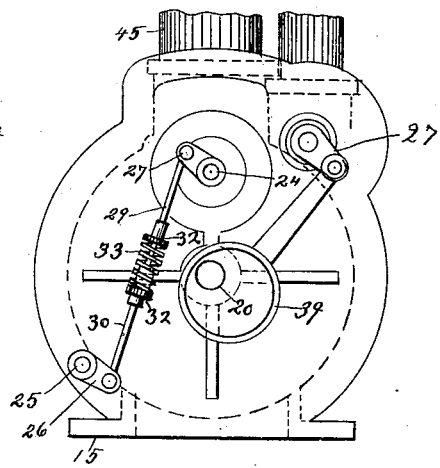
Figure 3:
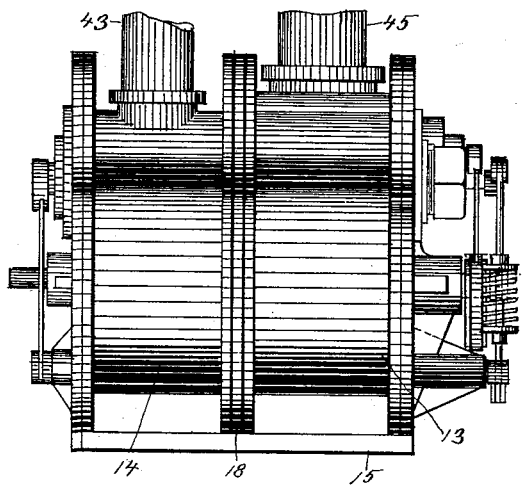
Figure 4:
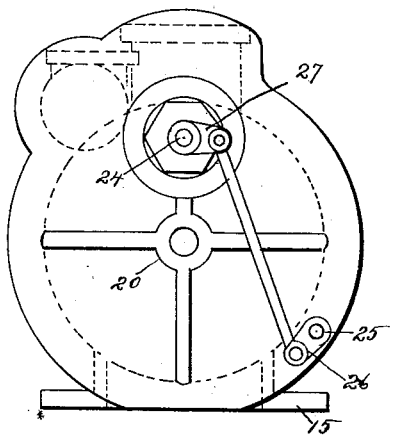

Figure 1 is a front elevation of a rotary engine constructed according to my invention. Fig. 2 is an end view of the same. Fig. 3 is a rear elevation of the engine. Fig. 4 is a view of the other end. Fig. 5 is a longitudinal vertical section thereof. Fig. 6 is a transverse vertical section through one of the cylinders. Fig. 7 is a vertical section through the valve-chamber. Fig. 8 is a longitudinal section of the valve. Fig. 9 is an end view of the same. Fig. 10 is a vertical section of one of the abutments. Fig. 11 is an end view of the same, and Fig. 12 is a side and end elevation of one of the pistons.

In the accompanying drawings similar numerals of reference refer to like parts in each of the views, and in the practice of my invention I provide, as shown in the drawings, two cylinders 13 and 14, which may be mounted on a base 15 and which are secured together by flanges 16 and 17, between which is interposed a partition 18, by which the cylinders are separated. In each cylinder I mount a piston 19, which is circular in form and is mounted eccentrically on the main shaft 20, which passes through both cylinders concentrically thereof, and the pistons in the two cylinders are oppositely mounted and proportioned in size, so that they are substantially in tangential contact with the walls of the respective cylinders, so that when the point of contact of one piston is passing its respective valve the other piston is working under a full head of steam, as will be readily understood.

Mounted in the wall of each cylinder in a crescent-shaped cavity 21 is an abutment 22, each of which is provided at each end with a circular head 23, which are mounted in circular recesses at each end of the cylinder, and a shaft 24 passes into each abutment and through the end of the respective cylinder through a suitable stuffing-box.

Mounted on the front of the cylinders in suitable bearings is a shaft 25, on each end of which is a crank-arm 26, and a similar crank-arm 27 is mounted on each of the shafts 24. The crank-arms at the right of the engine are connected by a rod or link 28 integral throughout its extent; but the rod connecting the arms at the left of the engine is composed of two pieces 29 and 30, one of which is provided in the end thereof with a socket 31, in which the end of the other is slidably mounted, and on each part is mounted a jam-nut 32, while a compression-spring 33 has a tendency to force the parts 29 and 30 apart. The crank-arms are so disposed and the rods so proportioned in length that when the abutment in one cylinder is in contact with the lowest point of the respective piston the abutment will be at the highest point of the piston in the other cylinder and one will ascend while the other descends, so that the edges of the abutments will always be held in close contact with the respective cylinders. In practice, however, I have found that when the pistons are rotating very rapidly there will be certain irregularities in the pistons, and also in mounting the pistons in the cylinders it is impossible to make them exactly the same, so that I have provided the spring 33 to meet these irregularities and to insure close contact between the abutments and the pistons.

On the under side of each abutment, adjacent to the center thereof, I secure one edge of a plate or bearing-strip 34, (shown in full lines in Fig. 6 and in dotted lines in Fig. 11,) which projects outwardly in advance of the edge of said abutment and is held free from the body portion 35 of the abutment adjacent to the edge thereof, so that a pocket 36 is formed between the plate 34 and the body portion 35, into which live steam will enter and assist the spring action of the plate in holding the edge thereof against the piston, and the steam in the pocket 36 will also act as a cushion to counteract the tendency of the steam being exhausted through the exhaust-port from the previous rotation to raise the edge of the abutment from the piston.

Mounted on the cylinders is the steam-chest 37, in which is mounted the valve 38, which is made integral for both cylinders, as clearly shown in Figs. 8 and 9, and is operated by a single eccentric 39, mounted on the main shaft 20. The valve 38 is provided with sections 40 and 41, which are set at angles to each other and control the flow of steam through the ports 42 to the cylinders.

The operation will be readily understood. Steam is admitted to the steam-chests through the pipe 43 and is admitted to the respective cylinders alternately by the sections 40 and 41 of the valve, and as it enters the cylinders it bears against the part 44 of the piston, while the abutment serves to prevent the flow of steam in the opposite direction, so that the piston is forced to rotate, and the valve may be so adjusted that the steam will be cut off at any point of rotation and expand during the remaining portion of rotation, as will be readily understood. When the piston has completed the circuit, the steam is exhausted through the pipe 45, the passage to which is always left open by the abutments.

In order to insure against the unnecessary loss of steam and yet prevent friction, I provide the highest point of each piston with a plurality of transverse grooves 46, and the sides of the pistons are provided with concentric grooves 47, and water will accumulate in these grooves from the condensation of the steam and will serve as a packing to prevent the loss of steam without any appreciable amount of friction. I further guard against the loss of steam by recessing the ends of the cylinders and insert heads with long bearings 48, which extend within the plane of the rotation of the piston. These also serve to give steadiness to the engine, to reduce the wear, and by providing oil-holes 49 within the cylinder the motion of the piston will force the accumulations of oil within the cylinder into the bearings and lubricate the same. I may also provide pockets 50 in the pistons adjacent to the highest part to provide additional steam-space at the commencement of rotation.

Having thus described my invention, what I claim as new, and desire to secure by Letters Patent, is—

1. In a rotary engine, a plurality of cylinders, pistons eccentrically and oppositely mounted therein, abutments mounted in the walls of said cylinders and bearing with their edges against said pistons, a shaft mounted in suitable bearings, crank-arms on said shaft and on said abutments, and rods connecting said crank-arms whereby said abutments coact to keep the edges thereof against the respective pistons.

2. In a rotary engine a plurality of cylinders, pistons eccentrically and oppositely mounted therein, abutments mounted in the walls of said cylinders and bearing with their edges against said pistons, a shaft mounted on the cylinders, crank-arms on said shaft and on said abutments, and rods connecting said crank-arms whereby said abutments coact to keep the edges thereof against the respective pistons, as and for the purpose set forth.

3. In a rotary engine a plurality of cylinders, pistons oppositely mounted therein, abutments mounted in the walls of said cylinders and bearing with their edges against said pistons, a shaft mounted on the cylinders, crank-arms on said shaft and on said abutments, and rods connecting said crank-arms respectively whereby said abutments coact to keep the edges thereof against the respective pistons, one of said rods being composed of separate parts, and a compression-spring mounted between said parts, as and for the purpose set forth.

4. In a rotary engine, an abutment adapted to coöperate with the piston, and a bearing-plate secured at one edge thereof to the under side of said abutment the other edge projecting outwardly at an angle to said under side of the abutment whereby a pocket is formed between them, the free edge of said plate acting as a bearing-strip, as and for the purpose set forth.

5. In a rotary engine, an abutment adapted to coöperate with the piston, and a spring-plate secured at one edge thereof to the under side of said abutment, said plate projecting outwardly at an angle to the under side of said abutment whereby a pocket is formed between them, the free edge of said plate projecting in advance of said abutment to form a bearing edge, as and for the purpose set forth.

6. In a rotary engine, a piston provided with a concave end and a head having a bearing for the main shaft extending within the plane of rotation of said piston, said bearing being provided with an oil-hole exposed to the motion of said piston, as and for the purpose set forth.

7. A rotary engine comprising a plurality of cylinders, circular pistons in said cylinders in substantially tangential contact with the walls thereof, and oppositely mounted, cut-off valves operated by an eccentric on the main shaft and alternately admitting steam to said cylinders, abutments mounted in the walls of said cylinders and bearing with their edges against said pistons, and means connecting said abutments whereby they coact to keep their edges in contact with the respective pistons, and grooves in said pistons whereby a water packing is provided, as and for the purpose set forth.

In testimony whereof I have signed my name to this specification in the presence of two subscribing witnesses.

WILLIAM H. DOUGHERTY.

Witnesses:
E. L. LIVINGSTONE,
PAUL C. HAAN.